(12) United States Patent
Ramshaw et al.

(10) Patent No.: US 6,977,063 B1
(45) Date of Patent: Dec. 20, 2005

(54) ROTATING SURFACE OF REVOLUTION REACTOR WITH SHEARING MECHANISMS

(75) Inventors: Colin Ramshaw, Ponteland (GB); Roshan Jeet Jee Jachuck, Abbey Farm (GB); Michael Jones, Royston (GB); Ian Henderson, Stokesley (GB)

(73) Assignee: Protensive Limited, Cambridge (GB)

( * ) Notice: Subject to any disclaimer, the term of this patent is extended or adjusted under 35 U.S.C. 154(b) by 0 days.

(21) Appl. No.: 09/913,903

(22) PCT Filed: Feb. 17, 2000

(86) PCT No.: PCT/GB00/00523

§ 371 (c)(1),
(2), (4) Date: Jan. 15, 2002

(87) PCT Pub. No.: WO00/48730

PCT Pub. Date: Aug. 24, 2000

(30) Foreign Application Priority Data

Feb. 17, 1999 (GB) .................................. 9903474

(51) Int. Cl.[7] .............................................. B01J 19/08
(52) U.S. Cl. .................... 422/135; 422/138; 422/186; 422/186.3; 422/224
(58) Field of Search ................... 422/135, 138, 422/186, 186.3, 224; 261/88, 89

(56) References Cited

U.S. PATENT DOCUMENTS

| | | | |
|---|---|---|---|
| 3,831,907 A * | 8/1974 | Claes ...................... 366/172.1 |
| 4,311,570 A * | 1/1982 | Cowen et al. ......... 204/157.41 |
| 4,343,750 A | 8/1982 | Holiday et al. |
| 4,356,133 A | 10/1982 | Cowen et al. |
| 4,511,414 A | 4/1985 | Matsui et al. |
| 4,549,998 A | 10/1985 | Porter et al. |
| 4,627,803 A | 12/1986 | Umetsu |
| 5,624,999 A | 4/1997 | Lombardi et al. |
| 6,482,960 B1 * | 11/2002 | Brechtelsbauer et al. ... 549/332 |
| 6,515,153 B2 * | 2/2003 | Burns et al. .................. 554/69 |
| 6,740,763 B1 * | 5/2004 | Nowak et al. .............. 549/526 |
| 2003/0161767 A1 * | 8/2003 | Ramshaw et al. ...... 422/186.29 |

FOREIGN PATENT DOCUMENTS

| | | | |
|---|---|---|---|
| EP | 0 020 055 | | 12/1980 |
| EP | 0 499 361 A1 | | 8/1992 |
| EP | 0 810 633 A2 | | 12/1997 |
| GB | 328410 | | 5/1930 |
| GB | 1080863 | | 8/1967 |
| GB | 1600708 | | 10/1981 |
| GB | 2108407 | | 5/1983 |
| WO | WO 96/00189 | | 1/1996 |
| WO | WO 00/48729 | * | 8/2000 |
| WO | WO 01/60511 | * | 8/2001 |
| WO | WO 03/008460 | * | 1/2003 |

* cited by examiner

*Primary Examiner*—N. Bhat
(74) *Attorney, Agent, or Firm*—Garvey, Smith, Nehrbass & Doody, L.L.C.; Seth M. Nehrbass; Brett A. North (57) ABSTRACT

A reactor including a rotatable disc (3) having a surface (5) onto which reactant (15) is supplied by way of a feed (4). The disc (3) is rotated at high speed, and the reactant (15) spills over the surface (5) so as to form a film (17). A shear member (18, 20) is mounted close to the surface (5) so as to contact the film (17) during operation of the reactor, thereby applying a shearing force to the reactant (15) so as to aid mixing.

45 Claims, 3 Drawing Sheets

ROTATING SURFACE OF REVOLUTION REACTOR WITH SHEARING MECHANISMS

The present invention relates to a rotating surface of revolution reactor provided with various shearing mechanisms.

The invention makes use of rotating surfaces of revolution technology (hereinafter RSORT) (commonly known as spinning disc technology).

The spinning disc concept is an attempt to apply process intensification methods within the fields of heat and mass transfer. The technology operates by the use of high gravity fields created by rotation of a disc surface causing fluid introduced to the dire surface at its axis to flow radially outward under the influence of centrifugal acceleration in the form of thin often wavy films. Such thin films have been shown to significantly improve the heat and mass transfer rates and mixing. The technology was developed for typical heat and mass transfer operations such as heat exchanging, heating, cooling and mixing, blending and the like, for example as disclosed in R J J Jachuck and C Ramshaw, "Process Intensification: Heat transfer characteristics of tailored rotating surfaces", Heat Recovery Systems & CHP, Vol. 14, No 5, p475–491, 1994.

More recently the technology has been adapted for use as a reacting surface for systems which are heat and mass transfer limited, for example for the reaction of substrates which are highly viscous during at least a stage of the reaction and cause problems in achieving good mixing and product yields.

Boodhoo, Jachuck & Ramshaw disclose in "Process Intensification: Spinning Disc Polymeriser for the Manufacture of Polystyrene" the use of a spinning disc apparatus in which monomer and initiator is reacted by conventional means to provide a pre-polymer which is then passed across the surface of a spinning disc at elevated temperature providing a conversion product in the form of polymerised styrene.

EP 0 499 363 (Tioxide Group Services Limited) discloses another use for spinning disc technology in photo catalytic degradation of organic materials such a hydrocarbons. A solution of salicylic acid and titanium dioxide catalyst was passed across the surface of a rotating disc and irradiated with ultra violet light.

These publications therefore disclose the use of spinning disc technology for heating and mass transfer in inert and reactive systems.

GB 9903474.6 (University of Newcastle), from which the present application claims priority and the disclosure of which is hereby incorporated into the present application by reference, describes the use of RSORT in the conversion of a fluid phase substrate by dynamic hetergeneous contact with an agent. In this application, it is described how it has suprisingly been found that spinning disc technology may be further adapted to apply process intensification methods not only within the field of heat and mass transfer but also within the field of hetergeneous contaction. Furthermore, it is described how it has surprisingly been found that the quality of the product obtained is of higher quality than that obtained by conventional processing having, for example, a higher purity or, in polymers, a narrower molecular distribution.

In addition to this, spinning disc technology can be used to obtain products not readily obtainable by other technology.

According to the present invention, there is provided a reactor apparatus including a support element adapted to be rotatable about an axis, the support element having a surface with a periphery and feed means associated therewith for supplying at least one reactant to the surface such that, upon rotation of the surface, the reactant flows across the surface as a thin film and is thrown from the periphery thereof, characterised in that there is further provided a shear member which is disposed in close proximity to but not mounted on the surface so as, in use, to contact the thin film and to impart a shearing force to the reactant on the surface when the support element is rotated.

It is to be understood that the term "reactant" is not limited to substances which are intended to undergo chemical reaction on the first surface of the support element, but also includes substances which are intended to undergo physical or other processes such as mixing or heating. Similarly, the term "product" is intended to denote the substance or substances which are collected from the first surface of the support element, whether these have undergone chemical or physical processing or both. In addition, although it is envisaged that most reactants and produces will be in the liquid phase, the apparatus can be used with any suitable fluid phase reactants and products, including combinations of liquid, solid, and gaseous reactant and products. For example, solid phase substances in substantially free-flowing particulate form can have macroscopic fluid flow properties.

An RSORT apparatus (commonly known as a spinning disc reactor) generally includes within a conversion chamber a rotating surface or an assembly of a plurality of these which is rotated about an axis to effect transfer of one or more reactants from the axis preferably radially across the rotating surface.

An RSORT apparatus as hereinbefore defined comprising a rotating surface as hereinbefore defined has a number of advantageous constructional features according to the present invention.

When the support element of the present invention is rotated at an appropriate speed, reactant applied to the surface will tend to spread out on the surface so as to form a film. As the support element continues to rotate, product will be thrown from a periphery of the surface and reactant will migrate from the point of application towards the periphery. Various chemical and physical processes may be undergone by the reactant as it migrates across the surface, as described for example in GB 9903474.6. Reactant is generally applied by the feed means at least to a central portion of the surface, and optionally to other parts thereof.

The shear member may take a number of different forms. The important consideration is that the shear member must be close enough to the rotating surface so as to apply a shearing force to the film of reactant or product located thereon. In one embodiment, the rotating surface is generally planar, and preferably disc shaped (although other shapes, such as polygons or other regular or irregular shapes, are also usable). Here, the shear member may comprise at least one generally elongate member, which may be stationary with respect to the rotating surface or which may also rotate with or against the rotating surface or otherwise move, provided that there is relative movement between the rotating surface and the elongate member during operation of the reactor. Alternatively, the shear member may comprise a generally planar surface of any appropriate size or shape, which again may be fixed relative to the rotating surface or which may also rotate with or against the rotating surface or otherwise move, provided that there is relative movement between the rotating surface and the planar surface during operation of the reactor. In yet a further embodiment, the shear member may comprise a dome or canopy of any appropriate size or shape, the dome or canopy having a peripheral basal surface which contacts the film of reactant or product on the rotating surface during operation of the reactor. The dome or canopy may be fixed relative to the rotating surface or may also rotate with or against the rotating surface or otherwise move, provided that there is relative movement between the rotating surface and the basal surface during operation. Instead of a dome or canopy, a cylindrical or tubular member (generally of circular cross-section although polygonal and other regular and irregular cross-sections may also be of use) having a peripheral basal surface as above may be provided. The cylindrical or tubular member may be of constant cross-section along its length, or may converge, diverge or otherwise change its cross-section along its length, and may be stationary with respect to the rotating surface or may rotate with or against the rotating surface or otherwise move, as described above.

In embodiments where the shear member is rotatable, the shear member may rotate about the same axis of rotation as the rotating surface, or may rotate about an offset but generally parallel axis so as to have an orbital motion with respect to the rotating surface. The shear member may rotate in an opposite direction from the rotating surface, or may rotate in the same direction but at a different rotational speed. Where the shear member rotates about an offset axis, then it may be rotated in the same direction and at the same speed as the rotating surface while still providing the required shearing force through the resulting orbital motion.

Advantageously, the shear member may be moved closer to or further away from the rotating surface so as to allow the applied shearing force to be varied.

Alternatively, the rotating surface is not generally planar but is formed as an interior surface of a cone, dome or canopy shaped support element. Preferably, the support element has a substantially circular cross-section when sectioned along a plane which is substantially perpendicular to the axis of rotation. Reactant is applied by way of the feed means to a central inner portion of the surface before being spread across the surface in the form of a thin film. In this embodiment, the shear member may take the form of a plug shaped such that, when the plug is mounted coaxially at least partially within the support element, a circumferential region of the plug applies a shearing force to the reactant or product film on the rotating interior surface while still allowing the support element to rotate freely. In other words, the plug is preferably shaped so that its circumferential region matches the shape of the interior rotating surface but is slightly smaller so as to allow free rotation of the support element. In some embodiments, the plug may be generally disc shaped, having a circumferential wall shaped so as preferably to complement the shape of the interior rotating surface along the axis of rotation. Alternatively, the plug may also be cone, dome or canopy shaped, and sized so that it may be coaxially mounted at least partially inside the support element and such that an external surface of the plug complements the interior rotating surface of the support element. In all of these embodiments, the plug is preferably movable along the axis of rotation of the support element so as to adjust its proximity to the interior rotating surface and thus to adjust the applied shearing force. The plug may be held stationary with respect to the support element, or may be rotated in the same or in an opposite direction, provided that there is relative movement between the plug and the interior rotating surface.

By applying a shearing force in this way, excellent mixing of reactants may be achieved. The reactor of the present invention is particularly suited to forming emulsions of two or more generally immiscible fluids and to promoting intimate mixing of all types of fluids.

The shear member may be coated or otherwise provided with a catalyst, typically a heterogeneous catalyst, as may the surface of the support element. Examples of suitable catalytic coatings include nickel, palladium, platinum and various alloys. The application of a catalyst can help to promote chemical reactions in the reactor.

The part of the shear member which contacts the film of reactant on the rotating surface may be generally smooth, or may be provided with discontinuities such as a mesh, grid or corrugations which serve to enhance surface areas.

The shear member may also be provided with heating or cooling means, such as an electric heater or a heat exchanger thermally connected thereto.

The axis of rotation of the rotating surface or support element may be substantially vertical, in which case gravity tends to pull reactants downwardly with respect to the surface or support member. This may be advantageous with less viscous reactants. Alternatively, the axis of rotation may be generally horizontal, which can achieve improved mixing of reactants provided that these are appropriately retained on the first surface of the support member.

Any suitable feed means may be provided to feed the at least one reactant onto the rotating surface. For example, the feed means may comprise a feed distributor in the form of a "shower head", a "necklace" of outlets or a simple, preferably adjustable, single point introduction such as a "hose-pipe type" feed means. Preferably, the feed means comprises a feed distributor having a plurality of uniformly spaced outlets for the at least one reactant on to the rotating surface as hereinbefore defined. The feed means may also include means for applying UV, IR, X-ray, RF, microwave or other types of electromagnetic radiation or energy, including magnetic and electric fields, to the reactants as they are fed to the trough, or may include means for applying vibration, such as ultrasonic vibration, or heat.

The feed means may be provided at any suitable position with respect to the rotating surface which allows feed of the reactant. For example, the feed means may be axially aligned with the rotating surface for axial feed. Alternatively, the feed means may be positioned such that the feed is spaced from the axis of the rotating surface. Such a position may lead to more turbulence and an enhanced mixing effect.

Advantageously, the rotating surface includes a trough into which the at least one reactant is supplied by the feed means.

The depth of the trough in the rotating surface may be selected in accordance with reaction requirements. For example, for photochemical reactions in which UV light is shone onto the reactant, it is preferred for the trough to be relatively shallow, for example having a depth of the same order of magnitude or within one order of magnitude as the expected thickness of a film of reactant formed across the first surface of the support element when rotating at an appropriate speed.

In one embodiment, feed means may comprise a single feed to each trough which is preferably situated on or co-axial with the axis of rotation of the rotating surface. In this embodiment, reactant flows from the feed outlet into the trough and is subsequently spread out of the trough on to the rotating surface by centrifugal force. In a preferred embodiment, the rotating element as hereinbefore defined comprises a trough situated on the axis of rotation.

The trough as hereinbefore defined may be of any suitable shape such as continuous or annular. For example it may have a continuous concave surface comprising part of a sphere, such as a hemispherical surface, or it may have an inner surface joined to the rotating surface by at least one connection wall or at least two, in the case where the trough is annular. The inner surface and connection wall may be of any form which allows the function of a trough to be fulfilled. For example the inner surface may be parallel to the rotating surface or concave or convex. The connection wall may comprise a single circular or ovoid wall or a plurality of straight walls. The walls may diverge or converge towards the rotating surface.

Preferably, a single circular wall is provided which converges towards the rotating surface to form an undercut trough. This shape generates a reservoir which enhances a circumferential distribution of the reactant or heat transfer fluid flow. Alternative means for forming an undercut trough are also envisaged. For example, where the trough is generally annular in shape, an outer wall may be provided as above, and an inner wall having any suitable shape may serve to define an inner edge to the trough. The undercut portion of the trough should generally be provided as an outer wall so as to help prevent uncontrolled egress of reactant or heat transfer fluid from the trough to the first or second surface under the influence of centrifugal force as the support element is rotated.

Advantageously, a matrix may be provided in the trough so as to help reactant or heat transfer fluid present in the trough to rotate with the support element, thereby helping to achieve substantially uniform flow from the trough across the first or second surface. The matrix may be in the form of a plug of fibrous mesh, such as metal or plastics wool, or may take the form of a plurality of projections which are secured to an inner surface of the trough. Other matrix means will be apparent to the skilled reader. In some embodiments, the matrix is manufactured of a material which is inert with respect to the at least one reactant or the product and which is not significantly affected by temperature and other variable process conditions. Alternatively, the matrix may be made of a material which does interact with the at least one reactant or the product, such as a heterogeneous catalyst (e.g. nickel, palladium or platinum or any suitable metal or alloy or compound thereof). Where the matrix is made out of an electrically conductive material, it may be possible to supply an electric current therethrough and thus to provide heating means for heating the at least one reactant within the trough.

In a further embodiment, there may be provided a plurality of feeds adapted selectively to supply one or more reactants to a plurality of troughs formed in the first surface. For example, where the support element is generally disc-like and has a substantially central axis of rotation, there may be provided a first central trough centred on the axis of rotation and feed means for supplying at least one reactant to the first trough, and at least one further trough, preferably also centred on the axis of rotation and having an annular configuration, the at least one further trough being provided with feed means for supplying a second reactant, which may be the same as or different from the first reactant, to the at least one further trough. It will be apparent to the skilled reader that a plurality of troughs may be provided in a similar manner on support elements with shapes other than generally disc-like.

By providing a plurality of troughs and feeds, a sequence of reactions can be performed across the first surface of the support element. For example, two reactants may be supplied to the first trough in which some mixing and reaction will take place. As the support element rotates, the reactants will spread from the first trough to the first surface of the support element, where further reaction and mixing takes place, and thence into a second annular trough concentric with the first trough. A third reactant may then be supplied to the second trough, and further mixing and reaction will take place as the third reactant and the two initial reactants and any associated product are spread from the second trough onto the first surface of the support element for further mixing and reaction. Because the direction of travel of the reactants and products is outwards from the axis of rotation, a controlled series of reactions can be carried out across the first surface of the support member.

Any suitable collection means may be provided for collection of the product as it leaves the rotating surface at its periphery. For example, there may be provided a receptacle in the form of a bowl or trough at least partially surrounding the rotating element or other fixed part of the apparatus. The collection means may additionally comprise a deflector positioned around the periphery of the rotating surface to deflect product into the collection means. The deflector is preferably positioned at an acute angle to the rotating surface.

The components of the collection means, such as the bowl or trough or deflector, may be coated or otherwise provided with a heterogeneous catalyst appropriate to the reactants being reacted on the support element, or may even consist entirely of a material which acts as a heterogeneous catalyst. Furthermore, the components of the collection means may be heated or cooled to a predetermined temperature so as to enable control over reaction parameters, for example by serving to halt the reaction between reactants as these leave the first surface in the form of product. Feed means for supplying a reactant to the product leaving the first surface may also be provided. For example, there may be provided feed means for feeding a quenching medium to product in the collection means so as to halt chemical or other reactions between reactants when these have left the first surface.

The collection means may further comprise outlet means of any suitable form. For example, there may be a single collection trough running around the periphery of the disc or a collection bowl partially surrounding the rotating element.

Outlet means may also be provided in the collection means and these may take the form of apertures of any size and form situated at any suitable position of the collection means to allow egress of the product. In one preferred embodiment, the outlet means are situated to allow vertical egress of the substrate in use.

Alternatively, the collection means may comprise an outer wall provided at the periphery of the support element so as to prevent product from being thrown from the first surface, and at least one pitot tube which extends into the product which is restrained at the periphery of the support element by the outer wall. The outer wall may converge generally towards the axis of rotation of the support member so as better to retain product while the support element is undergoing rotation, although other wall configurations, such as generally parallel to or divergent from the axis of rotation may also be useful.

Embodiments of the present invention may include multiple support elements, which may share a common axis of rotation and which may be mounted on a single rotatable shaft, or which may be provided with individual rotatable shafts. The collection means associated with any given support element may be connected to the feed means associated with any other given support element so as to link a number of support elements in series or parallel. In this way, a reaction may be conducted across a number of support elements in series or parallel. The collection means of a first support member may be directly connected to the feed means of a second support member, or may be connected by way of a processing unit such as a pump, extruder, heater or heat exchanger or any other appropriate device. This is especially useful when dealing with viscous products, such as those which are obtained in polymerisation reactions, since the viscous product of a first support element may be processed so as to acquire more favourable physical characteristics before being used as the reactant feed for a second support element.

For example, where the collection means comprises an outer wall on the first surface of the support element as described above, a number of support elements may be coaxially mounted on a single rotatable shaft so as to form a stack of support elements. A reactant feed is led to the trough of a first support element, and a collector in the form of a pitot tube has its tip located near the first surface of the first support element in the vicinity of the wall so as to take up product from this region. An end of the pitot tube remote from the tip is led to the trough of a second support element so as to allow the product of the first support element to serve as the reactant for the second support element, thereby allowing a number of reactions to take place in series. Alternatively, a number of parallel feeds may supply the same at least one reactant simultaneously to the troughs of a number of support elements and a number of parallel pitot tube collectors may gather product from a peripheral region of each support element, thereby allowing a reaction to take place across a number of support elements in parallel.

It is also envisaged that product collected from the periphery of a support element may be recycled as feed for that support element. This is useful for processes requiring an extended contact time for the reactants. The product may be fully or only partially recycled, depending on requirements.

Reference herein to a rotating surface is to any continuous or discrete planar or three dimensional surface or assembly which rotates approximately or truly about an axis, and preferably is reference to an approximate or true rotating surface of revolution. An approximate rotating surface of revolution may comprise an asymmetric axis and/or deviation in the surface body and/or circumference creating an axially or radially undulating surface of revolution. A discrete surface may be in the form of a mesh, grid, corrugated surface and the like.

Reference herein to a substantially radially outward flowing film as hereinbefore defined is to any fluid film which may be created by dynamic contact of the fluid phase reactant and the rotating surface as hereinbefore defined, suitably the fluid phase reactant is contacted with the rotating surface at any one or more surface locations and caused to flow outwardly by the action of centrifugal force. A film may be a continuous annulus or may be a non-continuous arc at any radial location. The substrate may provide a plurality of films in dynamic contact with a rotating surface as hereinbefore defined.

For example processes requiring extended contact time may be carried out in continuous manner with use of a recycle of fluid exiting at the periphery of the rotating surface towards the axis of the rotating surface enabling sequential passes of fluid across the surface. In continuous steady state operation an amount of fluid exiting the surface may be drawn off as product and an amount may be returned by recycle for further conversion with an amount of fresh reactant feed.

The process of the invention as hereinbefore defined may operated in a single or plural stages. A plural stage process may comprise a first pre-process stage with further post-process or upgrading stages, and may be carried out batch-wise with use of a single rotating surface as hereinbefore defined or may be carried out in continuous manner with multiple rotating surfaces in series.

Second or more reactants may be added to the feed reactant as it passes from one rotating assembly to the next or be added directly to the rotating assembly anywhere between the axis of rotation or the exit from the assembly. In certain cases a multi-step process may be achieved by reactant addition or additions between the axis of rotation and the exit of a single rotating assembly to achieve more than one process step in a single pass. It is also possible to have different regions of the rotating surface at different temperatures and conditions and have different surface geometries as appropriate to the process needs.

It will be apparent that the process of the invention may be controlled both by selection of a specific rotating surface for the support element and by selecting process variables such as temperature, speed of rotation, rate of reactant feed, conversion time and the like. Accordingly the process of the invention provides enhanced flexibility in process control including both conventional control by means of operating conditions, and additionally control by means of rotating surface type.

The apparatus may further comprise any suitable control system. Such a control system may regulate the temperature or contact time of reactants by means of speed of rotation, rate of substrate feed and other process parameters to obtain an optimum result.

The apparatus as hereinbefore defined may comprise means for optimising process conditions. For example, means for imparting an additional movement to the rotating surface, and thus to the reactant, may be provided. Such movement could be in any desired plane or plurality of planes and preferably comprises vibration. Any suitable vibration means may be provided, such as flexible mounting of the surface or off centre mounting, both inducing passive vibration or active vibration means, such as a mechanical element in contact with the rotating element and vibrating in a direction parallel to the rotating element axis. Preferably a passive vibration means is provided in the form of off centre mounting of the rotating element on its axis of rotation. Vibration may alternatively be provided by an ultrasonic emitter in contact with the rotating element for vibration in any desired plane or plurality of planes.

The rotating surface may have any shape and surface formation to optimise process conditions. For example the rotating surface may be generally planar or curved, frilled, corrugated or bent. The rotating surface may form a cone or be of generally frustoconical shape.

In one preferred embodiment the rotating surface is generally planar and preferably generally circular. The periphery of the rotating surface may form an oval, rectangle or other shape.

In another preferred embodiment the rotating surface is provided as the inner surface of a cone. The apparatus may comprise at least one cone and at least one other rotating surface or at least one pair of facing cones positioned so as to allow a two stage process with one or more reactants fed to each cone. Preferably product exits a smaller cone (or other surface of rotation) in a spray on to the surface of a larger cone (or other surface of rotation) by which it is at least partially surrounded and for the surface of which a further reactant is fed by feed means as hereinbefore defined, to allow mix of the product and reactant on the larger rotating surface. Preferably, means are provided such that the two cones counter rotate. Such an arrangement enhances mixing and intimate contact of the reactants and reduces the required physical contact time. Alternatively, means are provided such that the cones co-rotate or one is stationary.

A rotating surface of any shape and surface formation as hereinbefore defined may be provided with surface features which serve to promote the desired process. For example, the surface may be micro or macro profiled, micro or macro porous, non stick, for example may have a release coating, may be continuous or discontinuous and may comprise elements such as mesh, for example woven mesh, reticulate foam, pellets, cloth, pins or wires, for enhanced surface area, enhanced or reduced friction effect, enhanced or reduced laminar flow, shear mixing of recirculation flow in axial direction and the like.

In one preferred embodiment, mixing characteristics of the rotating surface are enhanced by the above features or the like provided on or in the rotating surface. These may be provided in any suitable regular or random arrangement of grids, concentric rings, spider web or like patterns which may be suitable for a given application.

Alternatively or additionally to any other surface feature, radially spaced pins in the form of circles or segments of circles may be provided.

In another preferred embodiment, a porous surface coating is provided, which aids processing of certain reactants. Such a coating may be provided in combination with any other of the aforementioned surface features.

Surface features in the form of grooves may be concentric or may be of any desired radially spaced form. For example, the grooves may form "wavy" or distorted circles for maximised mixing.

Grooves may be parallel sided, or may have one or both sides which diverge to form undercut grooves or which converge to form tapered grooves. Preferably, the grooves are undercut to promote mixing.

Grooves may be angled to project towards or away from the axis of the rotating surface to enhance or reduce undercut or taper.

Energy transfer means may be provided for the rotating surface or reactant or product as hereinbefore described. For example heating means may be provided to heat the reactant, for example, as part of the feed means. Additionally, or alternatively heating means may be provided to heat the rotating element in the form of radiant or other heaters positioned on the face of the rotating element which does not comprise the rotating surface for conversion. Preferably, radially spaced, generally circular radiant heaters are provided.

Any preferred cooling or quenching means may be provided in a suitable position to cool the reacted substrate. For example cooling coils or a heat sink may provide cooling by heat exchange, or a reservoir of quench may provide cooling or reaction termination by intimate mixing in the collection means.

For a better understanding of the present invention and to show how it may be carried into effect, reference shall now be made by way of example to the accompanying drawings, in which.

BRIEF DESCRIPTION OF THE DRAWINGS

Figure 1:
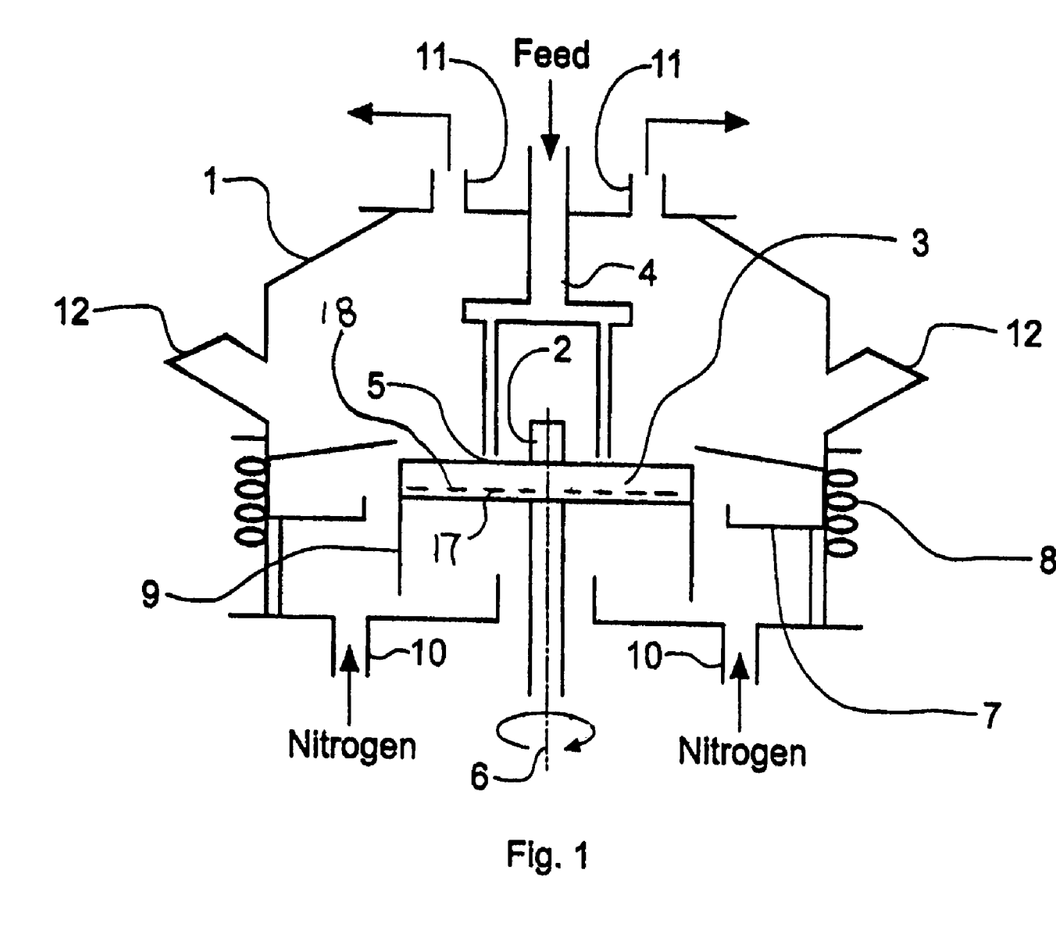
FIG. 1 shows a spinning disc apparatus in schematic form.

FIG. 1 illustrates a spinning disc apparatus of the present invention. The apparatus is enclosed in vessel (1) having at its axis a drive shaft (2) supporting a spinning disc (3). Feed means (4) provides reactant to the surface (5) of the disc (3) about its axis (6). Rotation of the disc (3) causes reactant to flow radially outwards, whereby it contacts the surface (5) of the spinning disc (3) and forms a film (17) thereacross. A stationary, annular shear member (18) is located just above the surface (5) such that a basal portion (19) of the shear member (18) contacts the film (17) and applies a shearing force thereto when the disc (3) is rotated. Fluid is collected at the peripheral edges of the disc (3) by means of collection trough (7) and may be rapidly quenched by means of cooling coils (8). A skirt (9) prevents meniscal draw back of fluid contaminating the drive shaft mechanism. Inlet means (10) enable controlled environment conditions to the provided, for example a nitrogen atmosphere. Outlet vent means (11) enable the venting of atmospheric gases or gases evolved during operation. Observation means are provided by means of windows (12) to observe the progress of the conversion.

The apparatus of FIG. 1 may be started up and operated as described in Example 1 below. In the case that the process is an exothermic conversion, cooling coils (8) may be used to quench the collected product in the trough (7). The spinning disc (3) is provided with heating coils (not shown) which may be used to initiate or maintain conversion. The disc (3) or the reactor vessel (1) may be provided with a source of radiation, means for applying an electric or magnetic field and the like as described, at or above the disc surface (5) or at the wall of the reactor vessel (1).

Figure 2:
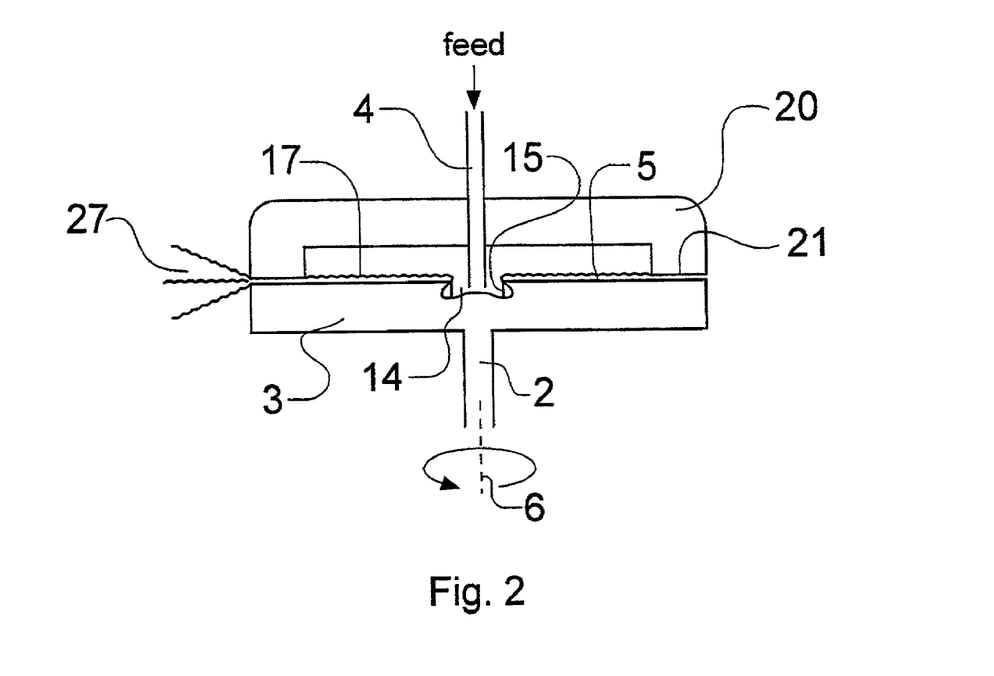
FIG. 2 shows a spinning disc provided with a dome shaped shear member.

FIG. 2 shows a spinning disc (3) having a surface (5) and mounted on a drive shaft (2) which defines an axis of rotation (6). A feed pipe (4) supplies reactant (15) to a central trough (14) (see below) from where the reactant (15) spills onto the surface (5) in the form of a film (17). A shear member in the form of a canopy (20) having a peripheral basal surface (21) is mounted over the disc (3) such that, in operation, the basal surface (21) contacts the film (17) and applies a shearing force thereto by virtue of relative movement between the basal surface (21) and the rotating surface (5). This shearing force helps to promote intimate mixing of the reactant (15). The canopy (20) may be fixed relative to the disc (3), or may be adapted to rotate in either the same or the opposite direction, provided always that there is relative movement between the basal surface (21) and the rotating surface (5). Furthermore, the spacing between the basal surface (21) and the rotating surface (5) may be adjusted by moving the canopy (20) up or down so as to vary the shearing force applied to the film (17). Product (27) is thrown from the rotating surface (5) at a peripheral portion thereof for collection.

Figure 3:
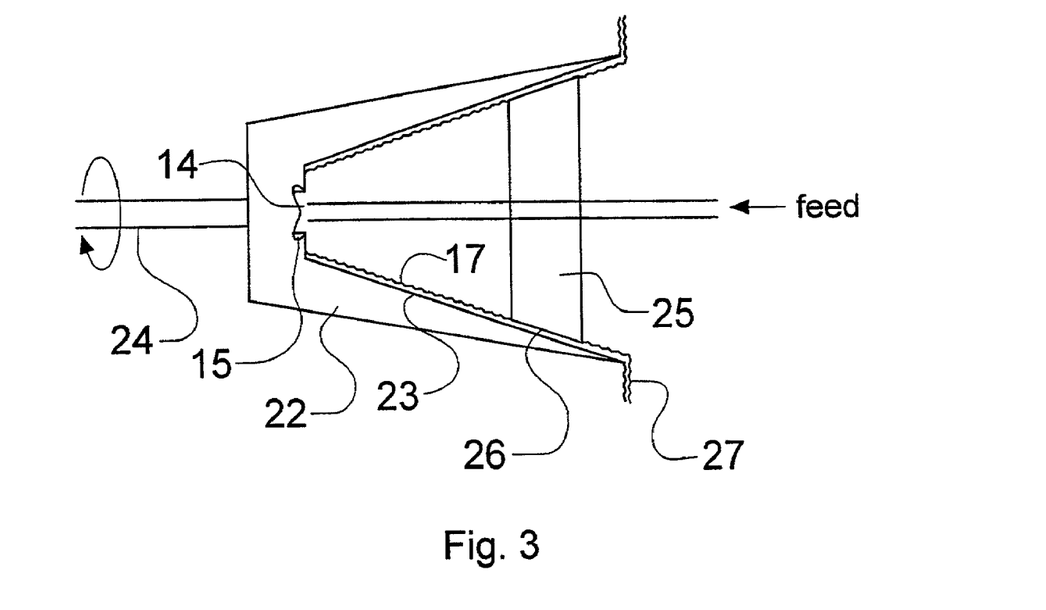
FIG. 3 shows a spinning cone with a plug shear member.

FIG. 3 shows a beaker shaped support element (22) having an internal surface (23) with divergent sides and mounted on a horizontal drive shaft (24). Reactant (15) is supplied to a trough (14) in a base region of the support element (22) from where it spills out onto the surface (23) in the form of a film (17) when the support element (22) is rotated. A disc shaped plug (25) having a peripheral surface (26) complementary to the surface (23) is mounted in the support element (22) so as to contact the film (17) when the support element (22) is rotated, thus applying a shearing force. The plug (25) may be stationary or may rotate with or against the surface (23), provided always that there is relative movement between the two. By moving the plug back and forth along the axis of the drive shaft (24), the spacing between the peripheral surface (26) and the internal surface (23) may be varied so as to vary the applied shearing force. Product (27) is thrown from the inner surface (23) at a mouth portion of the support element (22) for collection.

Figure 4:
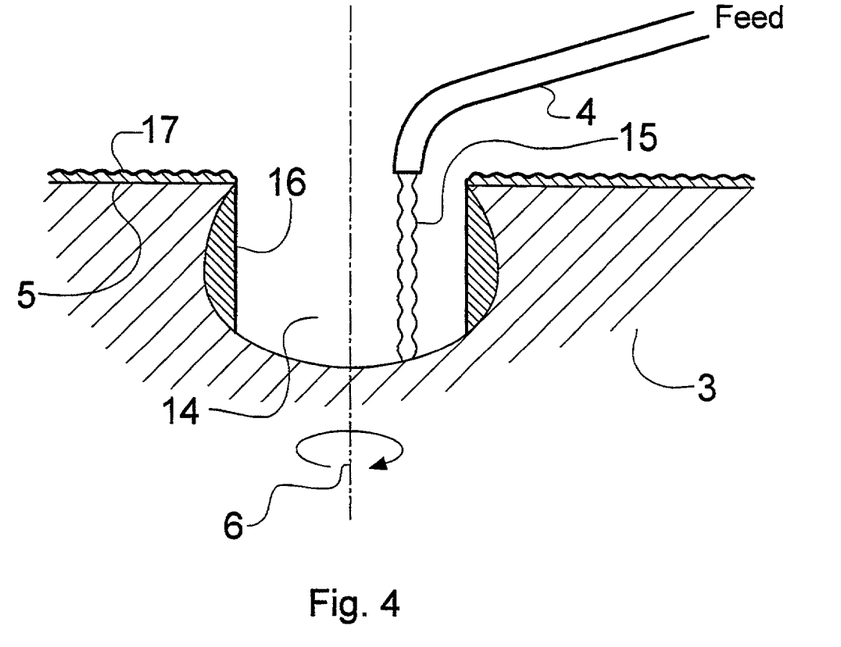
FIG. 4 shows a detail of a spinning disc having a central trough.

In FIG. 4 there is shown an axially located central trough (14) which is continuous and forms a well situated on the axis of rotation (6) of the rotating surface (5) of a disc (3). Rotation causes reactant or heat transfer fluid (15) supplied by the feed means (4) to flow to the wall and form an annular film (16) within the trough (14). The annular film (16) then spills over onto the surface (5) of the disc (3) to form a film (17) on the surface (5).

Figure 5:
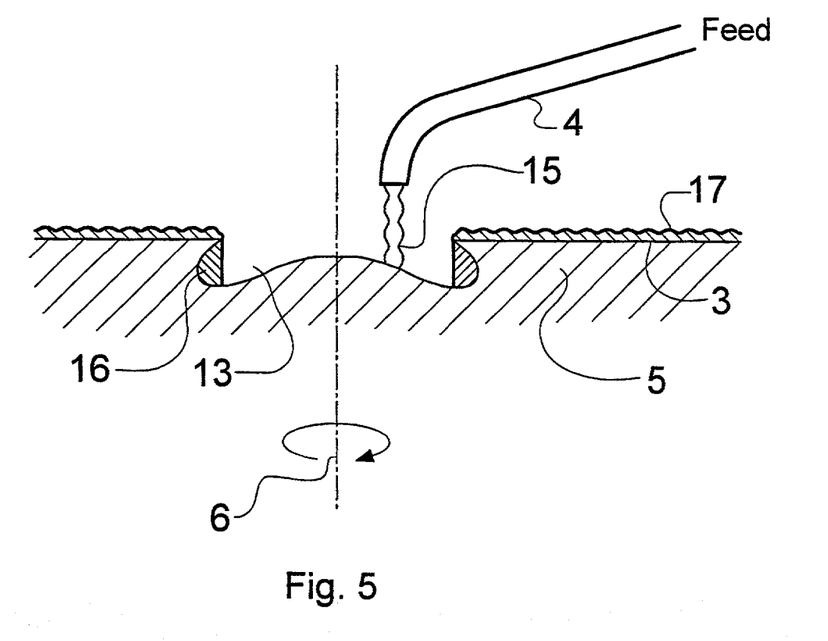
FIG. 5 shows a detail of a spinning disc having an annular trough.

In FIG. 5 the trough (13) is annular and forms a channel co-axial about the axis of rotation (6) of the disc (3). Rotation assisted by the trough profile causes reactant or heat transfer fluid (15) to flow into the trough (13) and to the wall thereof and form an annular film (16) within the trough (13) before spilling over onto the surface (5) of the disc (3) in the form of a film (17).

EXAMPLE 1

Polymerisation of Ethylene Using a Catalyst Coated Disc

Phillips catalyst was coated onto the surface of a spinning disc apparatus using methods as described hereinbefore. The coated disc was mounted in a spinning disc apparatus.

The spinning disc apparatus used is shown in diagrammatic form in FIG. 1. The main components of interest being:

i) Top Disc—A smooth brass disc of thickness 17 mm and diameter 500 mm capable of rotating around a vertical axis.

ii) Liquid Distributor—A circular copper pipe of diameter 100 mm, positioned concentrically over the disc, sprayed fluid vertically onto the disc surface from 50 uniformly spaced holes in the underside. Flowrate was controlled manually by a valve and monitored using a metric 18 size, stainless steel float rotameter. A typical fluid flow rate was 31.3 cc/s.

iii) Motor—A variable speed d.c. motor capable of rotating at 3000 rpm was used. The rotational speed was varied using a digital controller calibrated for disc speeds between 0 and 1000 rpm. A typical rotational speed was 50 rpm.

iv) Radiant Heaters—3 radiant heaters (each consisting of two elements) spaced equally below the disc provided heat to the disc. The temperature was varied using a temperature controller for each heater. Each heater temperature could be controlled up to 400° C. Triac regulators were used to control the speed of the controller response. (These remained on setting 10 throughout the tests).

v) Thermocouples and Datascanner—16 K-type thermocouples embedded in the top disc gave an indication of the surface temperature profile along the disc radius. Odd numbered thermocouples 1 to 15 inclusive were embedded from underneath the disc to a distance 3 mm from the upper disc surface. Even numbered thermocouples, 2 to 16 inclusive were embedded from underneath the disc to a distance 10 mm from the upper disc surface. Each pair of thermocouple, i.e. 1 & 2 and 3 & 4 and 5 & 6 etc., were embedded adjacently at radial distances of 85 mm, 95 mm, 110 nm, 128 mm, 150 nm, 175 mm, 205 mm and 245 mm respectively (see FIG. 3). The thermocouples were connected to the datascanner which transmitted and logged the data to the PC at set intervals using the DALITE Configuration and Monitoring Software Package.

vi) Manual Thermocouple—A hand-held K-type thermocouple was used to measure the bulk fluid temperature on top of the disc.

The rig was used in two arrangements. In one arrangement, feed was constantly added and the heated product was sent to the collection trough. In an alternative arrangement the rig was assembled with a recycle.

The spinning disc apparatus of FIG. 1 was started up and temperature and rotational speed adjusted. When steady stage was achieved gaseous ethylene was fed to the revolving catalyst coated disc surface at it axis. Product was withdrawn in the collection trough at the periphery of the disc. Analysis revealed the product was high grade polyethylene.

Further advantages of the invention are apparent from the foregoing.

What is claimed is:

1. A reactor apparatus including a support element adapted to be rotatable about an axis, the support element having a surface and feed means associated therewith for supplying at least one reactant to the surface such that, upon rotation of the surface, the reactant flows freely, solely by way of centrifugal force generated by rotation of the surface, across the surface as a thin film and is thrown from the surface, wherein the surface is substantially planar and wherein there is further provided a shear member formed as a peripheral basal surface of a dome or canopy or cylindrical or tubular member, the shear member being disposed in close proximity to but not mounted on the surface so as, in use, to contact the thin film only where it passes between the peripheral basal surface and the surface and not at other locations on the surface, and to impart a shearing force to the reactant on the surface when the support element is rotated.

2. A reactor as claimed in claim 1, wherein the shear member is adjustable so as to vary its spacing from the surface of the support element.

3. A reactor as claimed in claim 1, wherein the shear member is held stationary during rotation of the support element.

4. A reactor as claimed in claim 1, wherein the shear member is adapted, in use, to rotate in an opposite direction to the support element.

5. A reactor as claimed in claim 1, wherein the shear member is adapted, in use, to rotate in the same direction as the support element but at a different rotational speed.

6. A reactor as claimed in claim 4, wherein the shear member has an axis of rotation which is offset from the axis of rotation of the support element.

7. A reactor as claimed in claim 1, wherein the shear member is coated or otherwise provided with a heterogeneous catalyst.

8. A reactor as claimed in claim 1, wherein a surface of the shear member which, in use, contacts the reactant, is substantially smooth.

9. A reactor as claimed in claim 1, wherein a surface of the shear member which, in use, contacts the reactant, is provided with discontinuities which enhance its surface area.

10. A reactor as claimed in claim 9, wherein the discontinuities comprise a mesh, grid or corrugations.

11. A reactor as claimed in claim 1, wherein the shear member is provided with temperature control means.

12. A reactor as claimed in claim 11, wherein the temperature control means is a heater or heat exchanger.

13. A reactor apparatus including a support element adapted to be rotatable about an axis, the support element having a surface and feed means associated therewith for supplying at least one reactant to the surface such that, upon rotation of the surface, the reactant flows freely, solely by way of centrifugal force generated by rotation of the surface, across the surface as a thin film and is thrown from the surface, wherein the surface is formed as an interior surface of a cone shaped support element and wherein there is further provided a shear member which is disposed in close proximity to but not mounted on the surface so as, in use, to contact the thin film only where it passes between the shear member and the surface and not at other locations on the surface, and to impart a shearing force to the reactant on the surface when the support element is rotated.

14. A reactor as claimed in claim 13, wherein the interior surface of the support element has a substantially circular cross-section when sectioned along a plane substantially perpendicular to the axis of rotation.

15. A reactor as claimed in claim 13, wherein the shear member comprises a plug having a circumferential surface shaped such that, when the plug is mounted coaxially and at least partially within the support element, the circumferential surface contacts the reactant on the interior surface of the support element when the reactor is in use while allowing the support element to rotate freely.

16. A reactor as claimed in claim 15, wherein the plug is generally disc shaped.

17. A reactor as claimed in claim 15, wherein the plug is cone, dome or canopy shaped.

18. A reactor as claimed in claim 13, wherein the shear member is adjustable so as to vary its spacing from the surface of the support element.

19. A reactor as claimed in claim 13, wherein the shear member is held stationary during rotation of the support element.

20. A reactor as claimed in claim 13, wherein the shear member is adapted, in use, to rotate in an opposite direction to the support element.

21. A reactor as claimed in claim 13, wherein the shear member is adapted, in use, to rotate in the same direction as the support element but at a different rotational speed.

22. A reactor as claimed in claim 13, wherein the shear member is coated or otherwise provided with a heterogeneous catalyst.

23. A reactor as claimed in claim 13, wherein a surface of the shear member which, in use, contacts the reactant, is substantially smooth.

24. A reactor as claimed in claim 13, wherein a surface of the shear member which, in use, contacts the reactant, is provided with discontinuities which enhance its surface area.

25. A reactor as claimed in claim 24, wherein the discontinuities comprise a mesh, grid or corrugations.

26. A reactor as claimed in claim 13, wherein the shear member is provided with temperature control means.

27. A reactor as claimed in claim 26, wherein the temperature control means is a heater or heat exchanger.

28. A method of mixing or reacting at least one reactant using a reactor apparatus including a support element that rotates about an axis, the support element having a surface and feed means associated therewith for supplying the reactant to the surface, the reactor apparatus further including a shear member that is disposed in close proximity to but not mounted on the surface; wherein the shear member is disposed in close proximity only to certain predetermined parts of the surface but not to other parts of the surface, and wherein the reactant flows freely across the other parts of the surface, solely by way of centrifugal force generated by rotation of the surface, as a thin wavy film, and is thrown from the surface, and wherein the shear member contacts the thin film while it passes the certain predetermined parts of the surface and imparts a shearing force to the thin film.

29. A method according to claim 28, wherein the shear member comprises a dome or canopy having a peripheral basal surface which contacts the thin film.

30. A method according to claim 29, wherein the shear member has an axis of rotation which is offset from the axis of rotation of the support element.

31. A method according to claim 28, wherein the shear member comprises a cylindrical or tubular member having a peripheral basal surface which contacts the thin film.

32. A method according to claim 31, wherein the shear member has an axis of rotation which is offset from the axis of rotation of the support element.

33. A method according to claim 28, wherein the surface is formed as an interior surface of a cone, dome or canopy shaped support element.

34. A method according to claim 33, wherein the interior surface of the support element has a substantially circular cross-section when sectioned along a plane substantially perpendicular to the axis of rotation.

35. A method according to claim 33, wherein the shear member comprises a plug having a circumferential surface shaped such that, when the plug is mounted coaxially and at least partially within the support element, the circumferential surface contacts the thin film on the interior surface of the support element while allowing the support element to rotate freely.

36. A method according to claim 35, wherein the plug is generally disc shaped.

37. A method according to claim 35, wherein the plug is cone, dome or canopy shaped.

38. A method according to claim 28, wherein the shear member is adjustable so as to vary its spacing from the surface of the support element.

39. A method according to claim 28, wherein the shear member is held stationary during rotation of the support element.

40. A method according to claim 28, wherein the shear member rotates in an opposite direction to the support element.

41. A method according to claim 28, wherein the shear member rotates in the same direction as the support element but at a different rotational speed.

42. A method according to claim 28, wherein the shear member is coated or otherwise provided with a heterogeneous catalyst.

43. A method according to claim 28, wherein a surface of the shear member which contacts the thin film is substantially smooth.

44. A method according to claim 28, wherein a surface of the shear member which contacts the thin film is provided with discontinuities which enhance its surface area.

45. A method according to claim 28, wherein a temperature of the shear member is controlled by temperature control means.

* * * * *